United States Patent [19]

Marechal

[11] Patent Number: 5,584,532
[45] Date of Patent: Dec. 17, 1996

[54] CONVERTIBLE SEATS WITH VARIABLE DIMENSIONS FOR MEANS OF PUBLIC TRANSPORTATION, AND A CONVERTIBLE STRUCTURE WITH VARIABLE DIMENSIONS COMPRISING SAID SEATS

[75] Inventor: Robert R. L. Marechal, Paris, France

[73] Assignee: Societe Industrielle et Commerciale de Materiel Aeronautique (societe anonyme), Issoudun, France

[21] Appl. No.: 377,104

[22] Filed: Jan. 23, 1995

[30] Foreign Application Priority Data

Jan. 21, 1994 [FR] France ................... 94 00674

[51] Int. Cl.$^6$ ................................ A47C 3/025
[52] U.S. Cl. ...................... 297/284.1; 297/257
[58] Field of Search ................. 297/232, 248, 297/257, 284.1, 284.3, 463.1, 118

[56] References Cited

U.S. PATENT DOCUMENTS 3,637,253  1/1972  Maule et al. .
3,893,729  7/1975  Sherman et al. .
4,834,452  5/1989  Goodrich .
5,098,157  3/1992  Surat ..................... 287/250.1
5,284,379  2/1994  Arnold et al. ............. 297/257 X

FOREIGN PATENT DOCUMENTS 0331241     9/1989   European Pat. Off. .
WO90/11930 10/1990   WIPO .

Primary Examiner—Milton Nelson, Jr.
Attorney, Agent, or Firm—Young & Thompson

[57] ABSTRACT

A convertible seat with variable dimensions for public transportation, comprises back lengthening elements, association and positioning device to fit the lengthening elements on either side of the back opposite to the side-edges, and to position the lengthening elements between a retracted position corresponding to a position of minimum seat dimensions along a dimensional axis and a stretched position corresponding to a position of maximum seat dimensions along the dimensional axis.

17 Claims, 3 Drawing Sheets

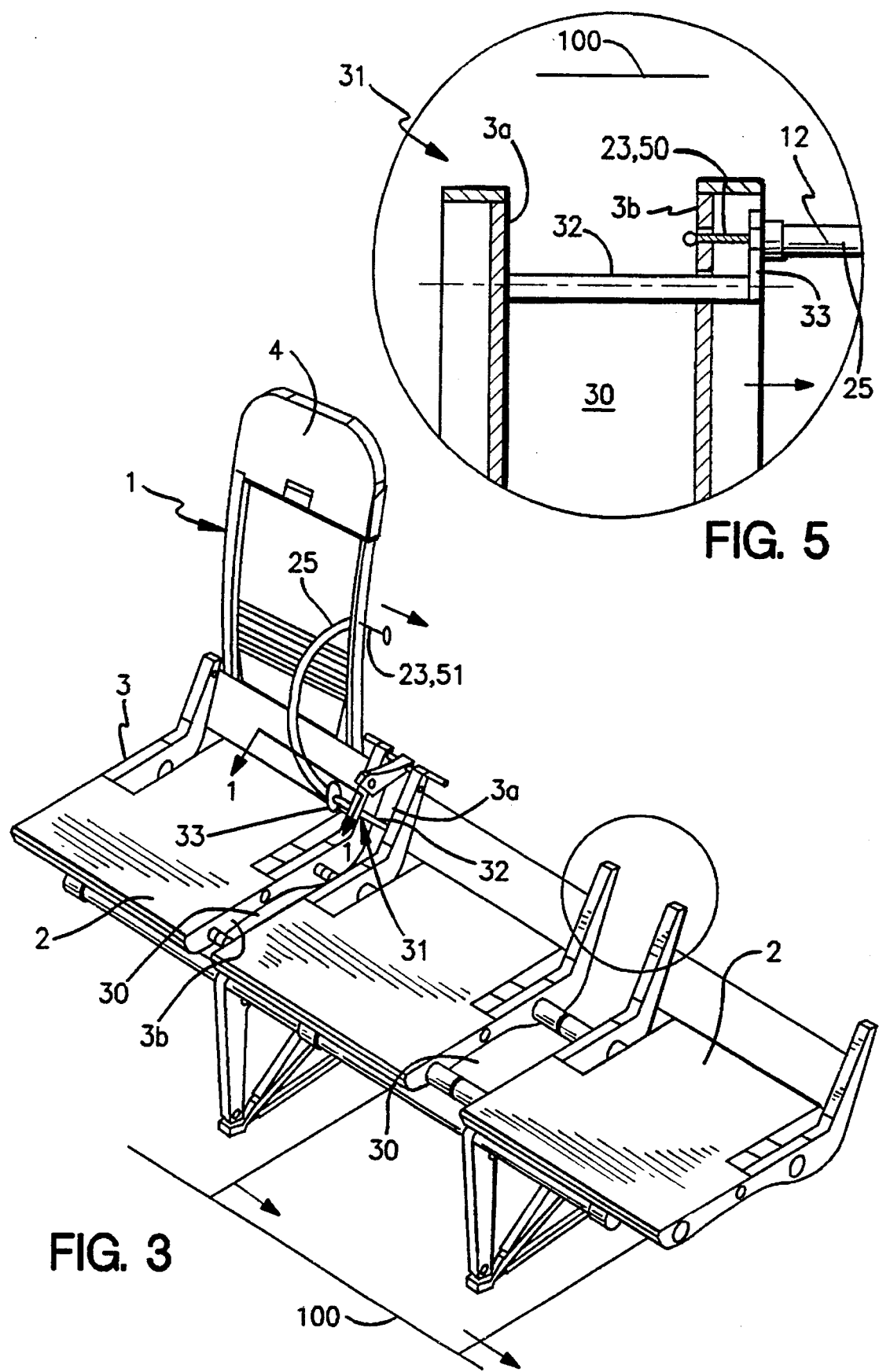

5,584,532

CONVERTIBLE SEATS WITH VARIABLE DIMENSIONS FOR MEANS OF PUBLIC TRANSPORTATION, AND A CONVERTIBLE STRUCTURE WITH VARIABLE DIMENSIONS COMPRISING SAID SEATS

FIELD OF THE INVENTION

The invention concerns a convertible seat with variable dimensions and a convertible structure with variable dimensions comprising such seats.

The invention mainly concerns such a seat and such a structure intended for means of public transportation, airliners in particular.

BACKGROUND OF THE INVENTION

At present, airline companies must be able to adapt the passenger cabin of one same airplane according to how full the different comfort and fare classes are.

For this purpose, airplane seat manufacturers have developed convertible seats and structures with variable dimensions making it possible to modify both the size of the seats and the overall dimensions of the multiple-seat structure.

EP-A-0530923, EP-A-0332930, EP-A-0443664 and EP-A0530920 concern this type of convertible seats and structures with variable dimensions.

These convertible structures or seats with variable dimensions are typically divided into two categories:

A first category in which to switch from one comfort class to another a number of seats are sacrificed so as to widen the remaining seats. For example, an economy class comfort three-seat structure will be transformed into a greater comfort two-seat structure by sacrificing the central seat, thereby making it possible to widen the structure's two side-seats. Generally speaking, in this category the full structure comprising two widened seats takes up less space than the lower comfort three-seat structure.

The second category concerns structures comprising a number of seats having a given width for comfort and in which the space between the seats and the position of the armrests is varied so as to give an impression of additional comfort without actually widening the back of the seat or the seating.

SUMMARY OF THE INVENTION

The purpose of the present invention is to provide a seat and a structure of the type corresponding to the second category with which the width of the back and/or the seating varies according to the quality of comfort chosen.

For this purpose, the invention concerns a public transportation seat, particularly in an airliner, convertible and with variable dimensions, comprising a seating transversely delimited by two lateral tie bars between which is fitted a seat back having a front face, a rear face and two side-edges. According to the present invention, the seat comprises back lengthening means, association and positioning means to fit the lengthening means on either side of the back opposite to the side-edges and to position the lengthening means between a retracted position corresponding to a position of minimum seat dimensions along the dimensional axis and a stretched position corresponding to a position of maximum seat dimensions along said dimensional axis.

The invention further concerns a structure with several adjacent seats for means of public transportation, airliners in particular, convertible and with variable dimensions along a sliding axis comprising:

a plurality of adjacent seats, separated from one another by a space between frames, each comprising a seating transversely delimited by two lateral tie bars between which a seat back is fitted, each seat being mobile with respect to the others along the sliding axis between two extreme positions, i.e. a first position referred to as maximum dimensions position in which the space between frames is at a maximum, and a second position referred to as minimum dimensions position in which the space between frames is at a minimum, and activation means to switch from one dimensions position to another.

According to the invention, the structure comprises at least one seat corresponding to the description provided above.

One advantage of the present invention is therefore that it makes it possible to vary the width of the back and/or the seating according to the space between the frame of two consecutive seats in one same structure.

BRIEF DESCRIPTION OF THE DRAWINGS

Further advantages will be clearly understood upon reading the description which follows with reference to the attached drawings in which:

FIG. 3 is a partial schematic representation of a structure in maximum dimensions position according to the present invention.

FIG. 5 is a sectional schematic representation of the coupling means in maximum dimensions position according to the present invention.

DETAILED DESCRIPTION OF THE INVENTION

Figure 1:
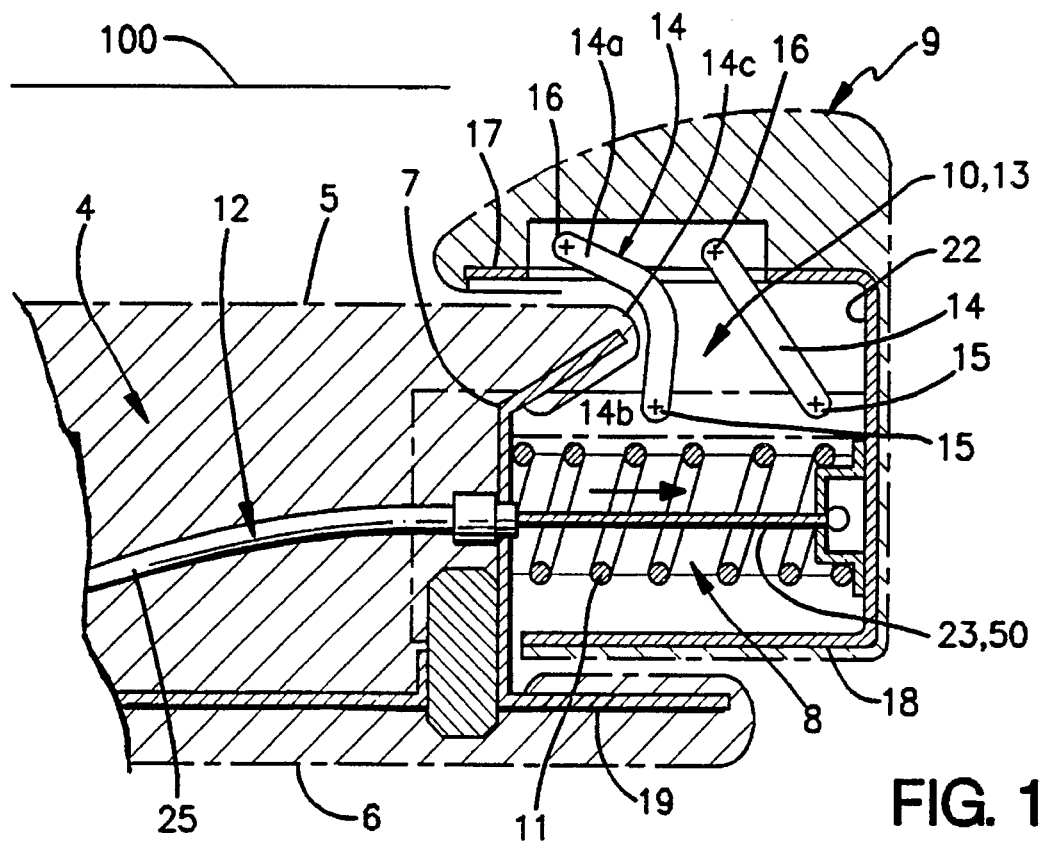
FIG. 1 is a cross-sectional partial schematic representation of a back with the lengthening flank in retracted position, taken along line 1—1 in FIG. 3 according to the present invention.
Figure 2:
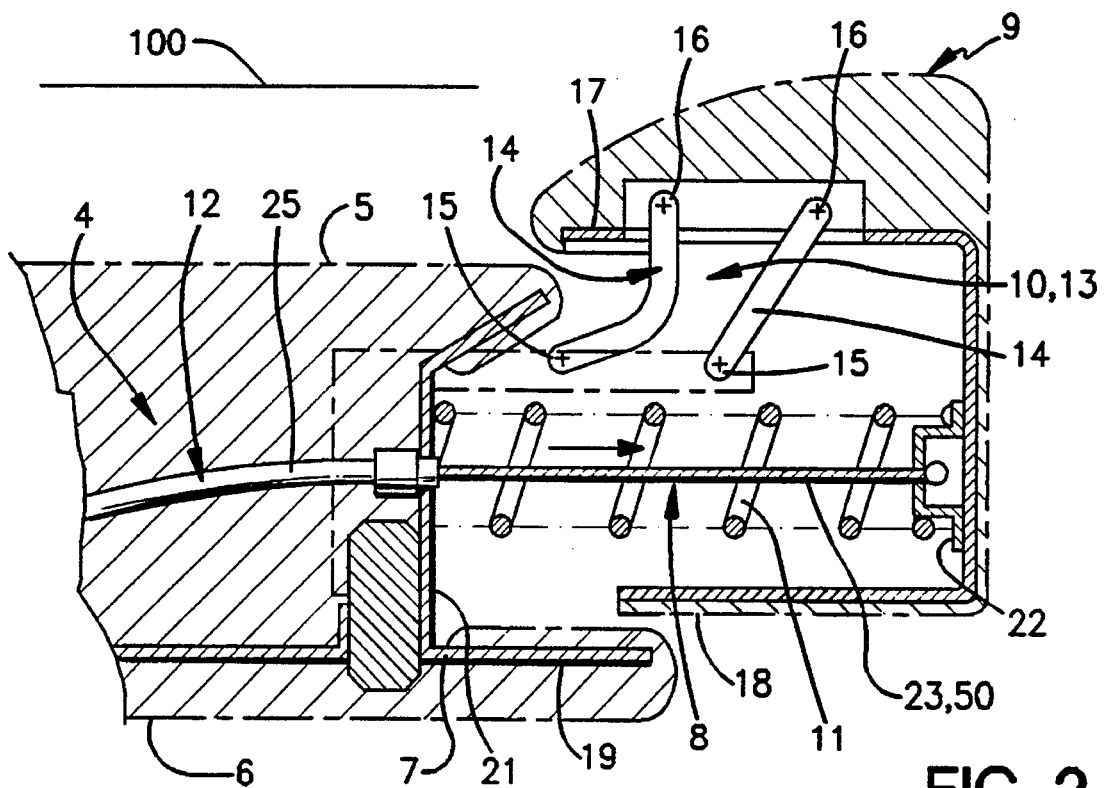
FIG. 2 is a cross-sectional partial schematic representation of a back with the lengthening flank in stretched position taken along line 2—2 in FIG. 4 according to the present invention.
Figures 4, 6:
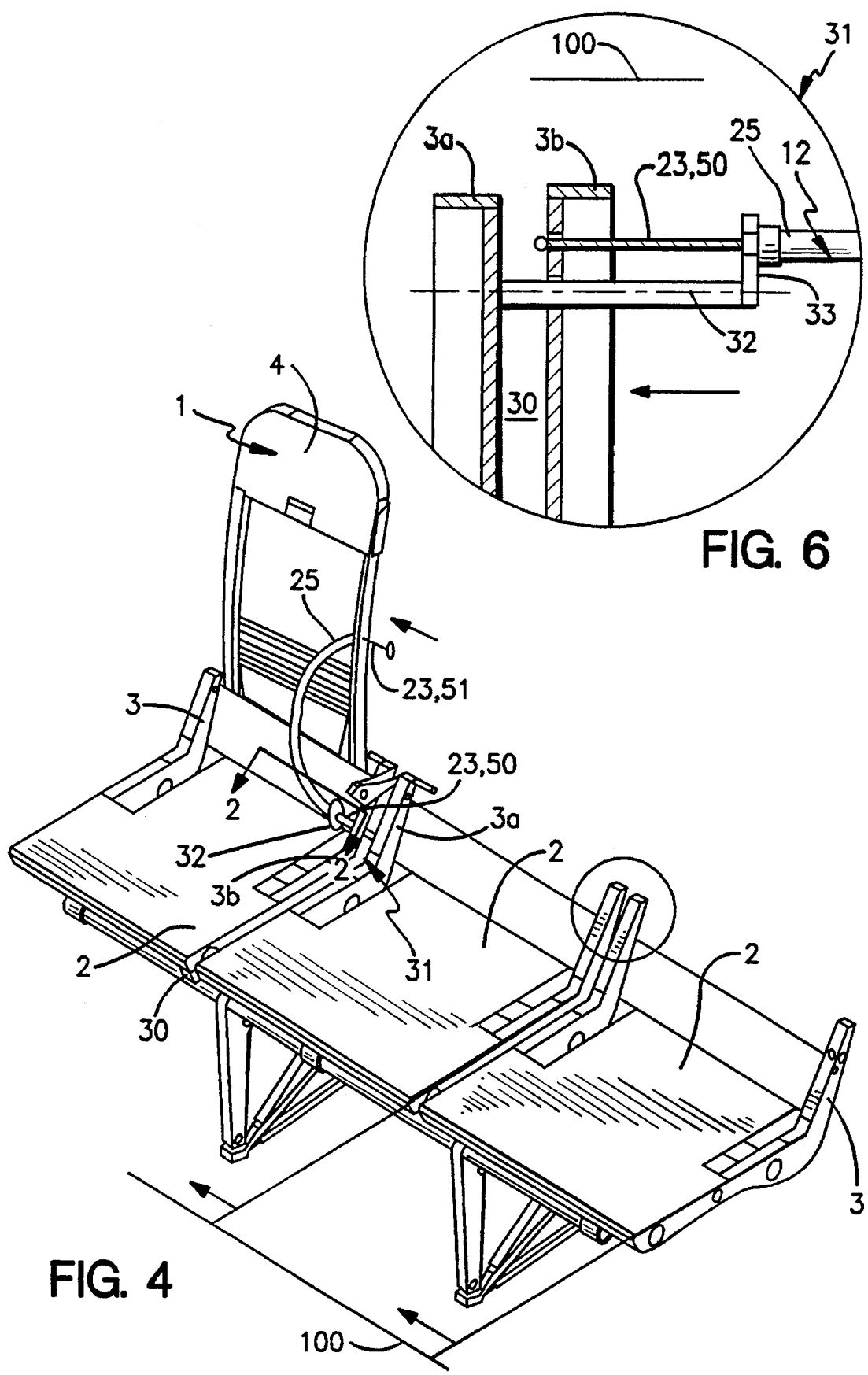
FIG. 4 is a partial schematic representation of a structure in minimum dimensions position according to the present invention.
FIG. 6 is a sectional schematic representation of the coupling means according to the invention in minimum dimensions position.

The invention concerns a seat for a means of public transportation, particularly an airliner, convertible and with variable dimensions. This seat comprises a seating 2 transversely delimited by two lateral tie bars 3 between which is fitted a seat back 4 having a front face 5, a rear face 6 and two side-edges 7.

Lengthening means 9 are associated to each side-edge 7 by association and positioning means 8. These lengthening means 9 are positioned opposite to the side-edges 7 of the back 4. These lengthening means 9 are mobile between two extreme positions, i.e.:

a retracted position corresponding to a minimum seat dimensions position along a dimensional axis 100; and a stretched position corresponding to a maximum seat dimensions position along said dimensional axis 100.

According to the invention, the association and positioning means 8 comprise articulation means 10 to associate the lengthening means 9 to the back 4 in a mobile manner, elastic means 11 forcing the lengthening means 9 into stretched position, and control means 12 and locking means to respectively control the displacement and lock the lengthening means 9 in one or the other of the extreme positions, retracted or stretched.

In one embodiment of the invention, the articulation means 10 comprise at least one connecting rod joint 13 having at least one connecting rod 14 fitted, on the one hand, to the back 4 near the side-edge 7 in question, free to rotate between the two extreme retracted and stretched positions about a first rotational axis 15 corresponding to the back 4 and substantially perpendicular to the dimensional axis 100 and, on the other hand, to the associated lengthening means 9, free to rotate about a second rotational axis 16 corresponding to said lengthening means 9 and parallel to the first axis 15.

In the embodiment shown in the figures, the lengthening means 9 comprise two side-flanks 9 each disposed along a side-edge 7 of the back 4. The cross-section of each side-flank 9 is generally U-shaped. In retracted position, the free front leg 17 of the U shape partially overlaps the outside of the front face 5 of the back 4.

Still in the embodiment shown in the figures, the cross-section of the side-edges 7 of the back 4 are generally U-shaped. In the retracted position, the other free leg 18 of the U shape of the side-flanks 9 overlaps the inside of the rear free leg 19 of the U shape of the side-edges 7 of the back 4.

In this embodiment, the openings of the U shapes are face-to-face and are nested into each other offset as shown in FIG. 1.

Still in the embodiment shown in the figures, the second axes 16 of the connecting rods 14 of the connecting rod joints 13 are borne by the front free legs 17 of the U-shaped side-flanks 9. The first axes 15 of the connecting rods 14 are born by an axes bearing integral with the side-edges 7.

In the embodiment shown in the figures, the connecting rod joints 13 comprise two connecting rods 14 fitted parallel to each other.

To render the movement between the two extreme positions as stable as possible, the distance between the rotational axes of the same type of connecting rods must be as large as possible.

For this purpose, according to the embodiment shown in the figures, the connecting rod 14 closest to the side-edge 7 is generally L-shaped so that, in retracted position, the leg 14a of the L-shaped connecting rod 14 towards side-flank 9 partially overlaps the outside of the front face 5 of the back 4. The intersection 14c of the legs 14a and 14b of the connecting rod 14 abuts against the intersection of the front face 5 of the back 4 and the corresponding side-edge 7. This L-shaped connecting rod makes it possible to skirt the intersection and thus to have a larger distance between axes 15 and between axes 16 while preserving a compact device.

Not shown in the figures, pins are provided against which the connecting rods abut in stretched position.

The elastic means 11 forcing the U-shaped side-flanks into the stretched position comprise at least one spring 11 pretensioned in compression and resting against the side-edge 7 of the back 4 and against the linking leg 22 of the U-shaped side-flank 9.

In the embodiment shown in the figures, the pretensioned spring 11 rests against the linking leg 21 of the U-shaped side-edge 7.

The control means making it possible to switch from extreme position to another can advantageously comprise a cable 23 and sheath 25 device.

In the embodiment shown in the figures, the cable 23 is associated to the linking leg 22 of the U-shaped side-flank and passes through the side-edge 7 of the back 4 in such a way that when the cable is pulled one switches from the stretched position to the retracted position, and when the cable is released one switches from the retracted position to the stretched position.

The movement performed by the side flank 9 when switching from one position to the other is a curved translation movement along the arc of a circle without any rotation of the side-flank 9 about itself due to the presence of the double connecting rods 14. There is therefore no modification of the orientation of the side-flank 9 with respect to the plane of the back 4 between the retracted position and the stretched position.

The invention also concerns a structure with several adjacent seats 1 for means of public transportation, airliners in particular, convertible and with variable dimensions along a sliding axis 100. This structure comprises a plurality of adjacent seats separated from one another by a space between frames 30. Each seat is mobile with respect to the others along the sliding axis 100 between two extreme positions, i.e. a first position referred to as maximum dimensions position in which the space between frames 30 is at a maximum, and a second position referred to as minimum dimensions position in which the space between frames 30 is at a minimum. In a well-known manner, this structure comprises activation means to switch from one dimensions position to another.

According to the invention, this structure comprises at least one seat of the type described above. In addition, this structure comprises coupling means 31 to couple the control means 12 so as to displace the lengthening side-flanks 9 of the seat(s) and activation means to displace the seats 1 from one dimensions position to another. It is thus possible, by means of a single manipulation, i.e. switching the structure to maximum or minimum dimensions position, to automatically displace the lengthening side-flanks 9 towards the stretched or retracted position, respectively.

In the embodiment shown in the figures, the coupling means comprise a rod 32 whose axis is parallel to the dimensional axis 100, integral with the tie bar 3a of an adjacent seat, fitted to the outside of said tie bar 3a and directed towards the tie bar 3b corresponding to a side-flank to be manipulated.

The rod 32 passes through the tie bar 3b, easily sliding through it.

Thus, depending on the space between frames 30, i.e., the space between the tie bars 3a and 3b, the rod 32 protrudes to a greater or lesser extent from the inner part of the tie bar 3b.

In the embodiment shown in the figures, the control means 12 to displace the lengthening side-flanks 9 comprise a cable device such that the cable 23 is associated to the lengthening side-flank 9, passes through the side-edge 7, and is associated to the transversal tie bar 3b.

The cable 23 is sheathed between the side-edge 7 of the back 4 and the end 33 of the rod 32.

Operation takes place as follows:

Starting off with a structure in minimum dimensions position, with the side-flanks in retracted position.

By manipulating the activation means, the structure is switched from the minimum dimensions position to the maximum dimensions position. This leads to an increase in the space between frames 30. As a result, the rod 32 switches from a maximum protruding position to a minimum protruding position with respect to the inner face of the tie bar 3b. Thus, the length 50 of the cable 23 between the tie bar 3b and the end 33 of the rod 32 decreases, which leads to an increase in the length 51 of cable 23 comprised between the side-edge 7 of the back 4 and the side-flank 9. The side-flank 9 submitted to the force of the spring 11 therefore moves away from the side-edge 7. With the structure in maximum dimensions position, the length 50 of cable 23 is minimal and the length 51 of cable 23 is maximal, making it possible for the side-flank 9 to be in stretched position.

Conversely, when switching from the maximum dimensions position to the minimum dimensions position, the activation means are manipulated so as to reduce the space between frames. This leads to rod 32 protruding more and more from the inner face of the tie bar 3b and an increase in the length 50 of the cable 23, which results in a decrease in the length 51 of the cable 23 and therefore the return of the side flank 9 to the retracted position.

I claim:

1. A convertible seat with variable dimensions for a means of public transportation, comprising a seating transversely delimited by two lateral tie bars between which is fitted a seat back extending in a first plane, and having a front face, a rear face and two side-edges, said seat including back lengthening means extending in a second plane substantially parallel to and spaced from the first plane, association and positioning means for fitting said lengthening means on either side of the back opposite to the side-edges, and for positioning the lengthening means between a retracted position corresponding to a position of minimum seat dimensions along a dimensional axis and a stretched position corresponding to a position of maximum seat dimensions along said dimensional axis, the orientation of said second plane when the lengthening means are in said stretched position being substantially identical to the orientation of said second plane when the lengthening means are in said retracted position, and means pivotally guiding the lengthening means so as to constantly face one side edge of the seat back at and between the retracted and stretched positions.

2. A structure with several adjacent convertible seats with variable dimensions along a sliding axis, comprising:

a plurality of adjacent seats, separated from one another by a space between frames, each seat comprising a seating transversely delimited by two lateral tie bars between which a seat back is fitted, each seat being mobile with respect to the others along the sliding axis between a first position referred to as maximum dimensions position in which the space between frames is at a maximum, and a second position referred to as minimum dimensions position in which the space between frames is at a minimum, activation means for switching from one dimensions position to another, and wherein at least one of the adjacent seats is a seat according to claim 1.

3. A structure according to claim 2, further including coupling means for coupling control means so as to displace lengthening side-flanks of the seats.

4. A structure according to claim 3, wherein the coupling means comprise a rigid rod having two ends, and an axis parallel to the sliding axis, one end being joined to an outer face of a tie bar of an adjacent seat, and directed towards a tie bar of a seat to be coupled, passing through the space between frames, and passing through and protruding from an inner face of the tie bar of the seat to be coupled, and the second end being operatively associated to the control means.

5. A structure according to claim 4, wherein the control means include a cable associated to a lengthening side-flank of said lengthening means at one of its ends and to a tie bar associated to its other end, said cable passing through an associated side edge and having a cable circulation sheath disposed between said side-edge and an end of the rod.

6. A seat according to claim 1, wherein the lengthening means comprise two side-flanks, each disposed along a side-edge of the back, and each having a generally U-shaped cross-section with a free front leg and a free rear leg, so that in the retracted position, the free front leg of the U shape partially overlaps the outside of the front face of the back.

7. A seat according to claim 6, wherein the cross-section of the side-edges of the back are generally U-shaped, so that in the retracted position, the free rear leg of the U shape of the side-flanks overlaps the inside of a rear free leg of the U shape of the side-edges of the back.

8. A seat according to claim 1, wherein the association and positioning means comprise articulation means for associating the lengthening means to the back in a mobile manner, elastic means for forcing the lengthening means into the stretched position, and control means and locking means for respectively controlling the displacement and locking of the lengthening means in one of the retracted and stretched positions.

9. A seat according to claim 8, wherein the control means comprise a cable and sheath device.

10. A seat according to claim 8, wherein the elastic means comprise at least one compressed spring resting against the side-edge of the back and against a linking leg of a U-shaped side-flank.

11. A seat according to claim 10, wherein the compressed spring is pretensioned and rests against a linking leg of the U-shaped side-edge.

12. A seat according to claim 8, wherein the articulation means comprise at least one connecting rod joint having at least one connecting rod, said rod having a first end fitted to the back near one of the side edges and free to rotate between the retracted and stretched positions about a first rotational axis corresponding to the back and substantially perpendicular to the dimensional axis, and a second end fitted to the lengthening means, free to rotate about a second rotational axis corresponding to said lengthening means and parallel to the first axis.

13. A seat according to claim 12, wherein the lengthening means comprise two side-flanks, each disposed along a side-edge of the back, and each having a generally U-shaped cross-section with a free front leg and a free rear leg, so that in the retracted position, the free front leg of the U shape partially overlaps the outside of the front face of the back.

14. A seat according to claim 13, wherein the connecting rod joint comprises two connecting rods which are fitted to the free front legs of the U-shaped side-flanks partially overlapping the outside of the front face of the back.

15. A seat according to claim 12, wherein the connecting rod joint comprises two connecting rods fitted parallel to each other.

16. A seat according to claim 15, wherein a connecting rod closest to the side-edge is L-shaped with two legs meeting at an intersection, so that in the retracted position, a leg of the L-shaped connecting rod partially overlaps the outside of the front face of the back, and the intersection of the legs of the connecting rod abuts against an intersection of the front face of the back and the corresponding side-edge.

17. A seat according to claim 16, wherein the control means comprise a cable and sheath device.

* * * * *